United States Patent [19]

Watts

[11] Patent Number: 5,149,223
[45] Date of Patent: Sep. 22, 1992

[54] DRIVE COUPLING

[75] Inventor: Geoffrey Watts, Herts, England

[73] Assignee: Xerox Corporation, Stamford, Conn.

[21] Appl. No.: 627,467

[22] Filed: Dec. 14, 1990

[30] Foreign Application Priority Data

Dec. 22, 1989 [GB] United Kingdom ................ 8929081

[51] Int. Cl.[5] ........................... F16B 7/00; F16D 3/00
[52] U.S. Cl. .................................. 403/359; 403/116;
464/39; 464/160
[58] Field of Search ............... 403/359, 116, 117, 166,
403/229, 291; 464/160, 38, 39

[56] References Cited

U.S. PATENT DOCUMENTS

| 2,338,725 | 1/1944 | Larson | 464/160 X |
|---|---|---|---|
| 2,870,886 | 1/1959 | Wood et al. | 464/39 X |
| 2,910,842 | 11/1959 | Sensenig | . |
| 3,136,400 | 6/1964 | Carr | 464/39 X |
| 4,437,782 | 3/1984 | Geisthoff | 403/13 |
| 4,494,358 | 1/1985 | Zalkin | 464/39 X |
| 4,859,110 | 8/1989 | Dommel | 403/325 |

FOREIGN PATENT DOCUMENTS

| 0233813 | 7/1989 | European Pat. Off. . |
| 509508 | 7/1939 | United Kingdom . |
| 1046028 | 7/1963 | United Kingdom . |
| 1463813 | 6/1974 | United Kingdom . |
| 1570330 | 2/1977 | United Kingdom . |
| 2214609 | 6/1989 | United Kingdom . |

Primary Examiner—Peter M. Cuomo
Attorney, Agent, or Firm—Robert A. Chitbum

[57] ABSTRACT

A replaceable xerographic cassette is coupled to a rotatable driving shaft in a copying machine by a rotary drive coupling member in which a splined drive shaft of the cassette engages as the latter is inserted into the machine. To accommodate angular misalignment of the shafts, the coupling member is of two-part form and two parts can rotate relative to one another as the shaft is being inserted, to take up any misalignment that may exist.

7 Claims, 2 Drawing Sheets

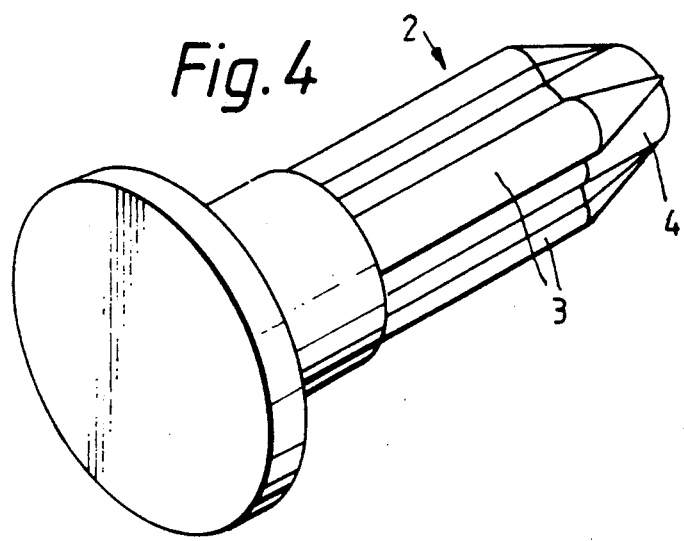
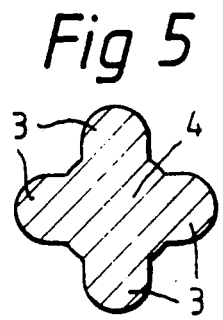
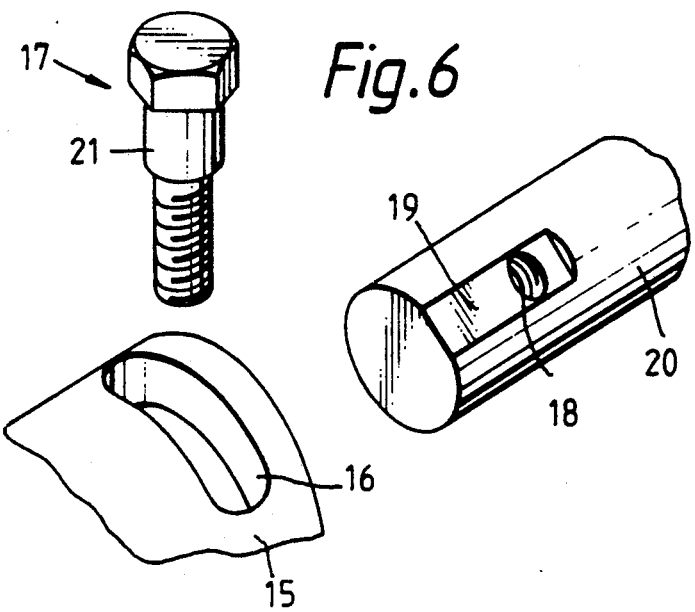

DRIVE COUPLING

BACKGROUND OF THE INVENTION

The present invention relates to a drive coupling for coupling together, and providing drive between, two rotatable members.

The invention is concerned, in particular, with a drive coupling of the type comprising a coupling member, for example a socket member, which is shaped to receive a splined shaft. The coupling member has internal spline-engaging elements so that, when the shaft is fully inserted into the coupling member, a rotational driving engagement is formed between the shaft and the coupling member. The coupling member and the splined shaft are each connected to, or form part of, a respective one of the rotatable members that are to be coupled together.

Drive couplings of that type are known, for example for coupling together two rotatable shafts. They are used, for example, in some xerographic copying machines, where they facilitate assembly during manufacture, and also dismantling and reassembly during servicing (although they have many other applications also). Problems can arise, however, if the shafts or other rotatable members are angularly misaligned when they are being coupled together because it may then be difficult or, in some cases, impossible, to make the required connection between them. It is known to chamfer or taper the ends of the splines of the splined shaft, to facilitate insertion of the shaft into the coupling member but, despite this, difficulties may still occur.

In the field of xerography, drive couplings of the type referred to above have been used in copying machines that employ replaceable cassettes to house some or most of the components required for the xerographic process. More particularly, it is known to use such a coupling to couple components within a cassette to a rotational drive member in the main body of the machine. In a known arrangement, such as disclosed in UK patent application GB-A-2 214 609, the splined shaft extends from the cassette and the intention is that it should engage in the coupling member as the cassette is being inserted into the machine. If the shaft is not correctly oriented, however, there can be difficulties in making the coupling and damage may result. With a view to overcoming this problem, a coupling has been proposed in which a limited amount of rotational movement is permitted between either the splined shaft or the coupling member and its respective rotatable member.

U.S. Pat. No. 4,437,782 to Geisthoff discloses a splined hub assembly for connecting two shafts which facilitates angular alignment of the splines relative to one another. The assembly has an opening formed in the wall of one of the members in which a ball is loosely held. The axial distance between the identical or greater than the axial length of the cylindrical ball contacting surface. Such a configuration allows for rotation of one of the splined members to facilitate alignment.

U.S. Pat. No. 4,859,110 to Dommel discloses an automatic coupling device for connecting a splined shaft to a corresponding internally splined yoke. A collar with flexible tabs is manually rotatable to an unlocked position and triggered to rotate to a locked position by locking balls. A torsional spring in the collar produces the rotation of the coupling device.

U.S. Pat. No. 2,910,842 to Sensinig discloses a coupling for use with a splined shaft with a yoke, whereby one member may be brought into alignment with the other. The splines are cut with angular faces. Upon insertion of the splined shaft into the yoke, a guide member rotates either or both members to bring them into alignment.

UK Patents GB-A-1 046 028; GB-A-1 463 813; GB-A-1 570 330; GB-A-509 508; and European Patent EP-A-0 233 813 disclose various other spline couplings for used in torque transmitting devices, automobile steering mechanisms, and the like.

SUMMARY OF THE INVENTION

It is an object of the present invention to provide a drive coupling that will facilitate the coupling together of two rotatable members even in the event of angular misalignment of the rotatable members.

The present invention provides a coupling member for a rotary drive coupling, the coupling member being shaped to receive a splined shaft and comprising two relatively-rotatable parts one of which has spline-engaging members for driving engagement with the shaft, the said one part being rotatable relative to the other part in either of two directions if the shaft is inserted in the coupling member without being angularly aligned therewith.

BRIEF DESCRIPTION OF THE DRAWINGS

By way of example, an embodiment of the invention will now be described with reference to the accompanying drawings, in which:

FIG. 4 is a perspective view of a splined shaft for use with the coupling member of FIGS. 1 to 3;

FIG. 5 is a cross-section of the shaft of FIG. 4 and

FIG. 6 is a perspective view showing the end of the coupling member and illustrating the connection of the coupling member to a shaft.

DESCRIPTION OF THE PREFERRED EMBODIMENT

Figure 1:
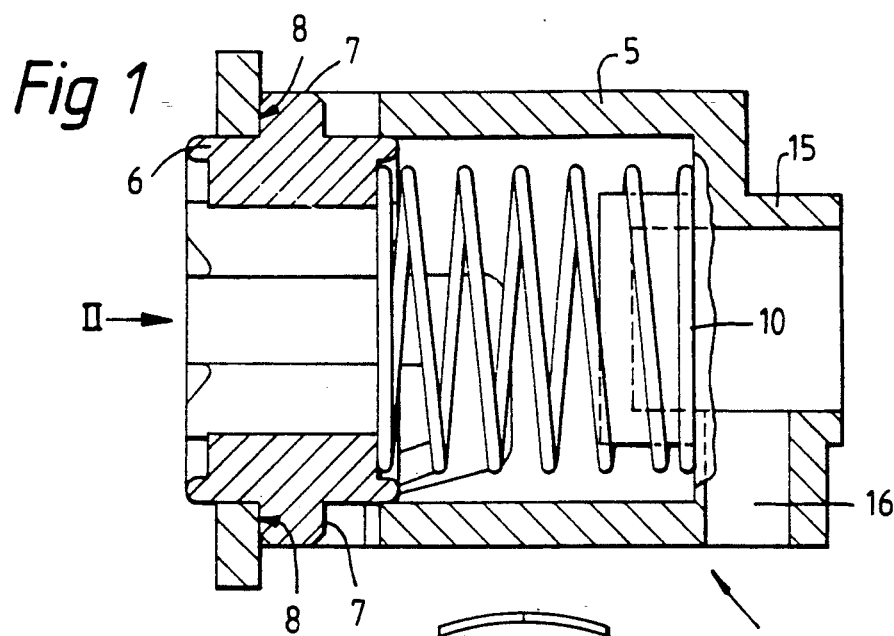
FIG. 1 is a cross-section of the coupling member of a drive coupling.

The drive coupling shown in the drawings comprises a socket member 1 (FIGS. 1 to 3) which receives a splined shaft 2 (FIGS. 4 and 5) so that the socket member and shaft are in driving engagement to transmit rotational movement. The coupling transmits movement between two rotatable members (not shown), one of which is connected to, or forms part of, the splined shaft 2 and the other of which is connected to the socket member 1 as will be described below. The two rotatable members may, for example, be rotatable shafts in which case the splined shaft 2 may be a splined end portion of one of those shafts.

The splined shaft 2 has four axially-extending splines 3 arranged around a central shaft portion 4 so that the shaft is of substantially cruciform cross-section as shown in FIG. 5. At the end of the shaft that is inserted into the socket member 1, each of the splines 3 tapers almost to a point.

The socket member 1 is of two-part form, comprising an outer part 5 and an inner part 6. The outer part 5 is generally in the form of a socket and the inner part 6, which is generally cylindrical and substantially shorter than the outer part, is located in the mouth of the latter.

The inner part 6 is a sliding fit within the outer part 5 and, about halfway along its length, has two diametrically-opposed outwardly-extending arms 7 which engage in respective guide tracks 8 cut out of the cylindrical wall of the outer part 5. Internally, the inner part 6 is also of substantially cruciform cross-section, having four axially-extending spline-engaging members 9 that are intended to engage, with clearance, between the splines 3 of the shaft 2 when the latter is inserted into the socket member 1. The leading ends of the spline-engaging members 9 (i.e. the ends at the mouth of the socket member 1) are tapered to facilitate the initial entry of the shaft into the inner part of the socket member.

A return spring 10, within the socket outer part 5, acts between the inner part 6 and the base of the outer part and urges the inner part towards the mouth of the socket member and into a position (shown in the drawings) in which the arms 7 are located at the start points 11 of the guide tracks 8.

Figure 3:
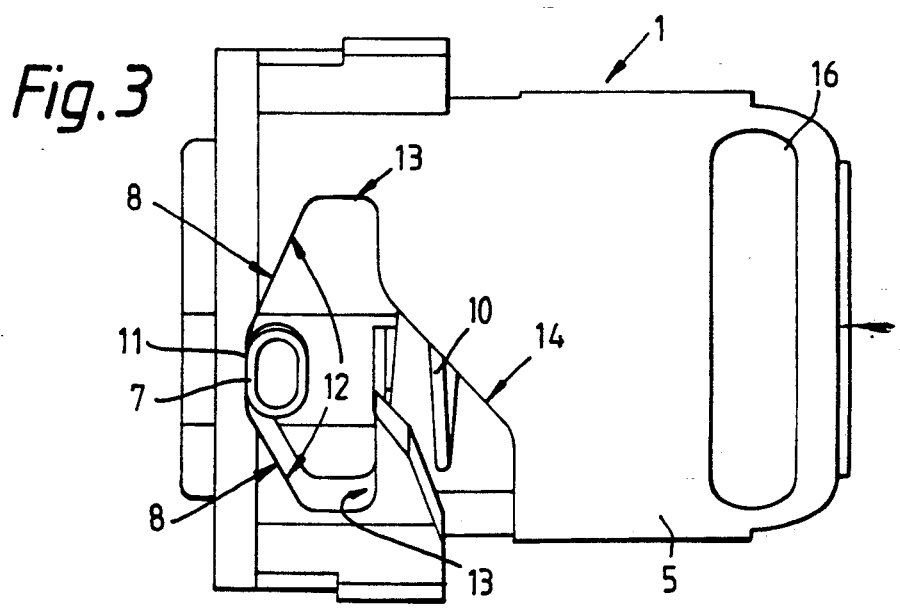
FIG. 3 is a side view of the coupling member.

The shape of one of the guide tracks 8 can be seen in FIG. 3: the shape of the other track is identicl. From the start point 11 of the track, inclined portions 12 (one on either side of the start point 11) lead to respective drive points 13 the purpose of which will be described below. Aligned with, but spaced from, the start point 11 along the length of the socket outer part 5 is the mouth of a further inclined guide track 14 the purpose of which will also be described below.

Figure 2:
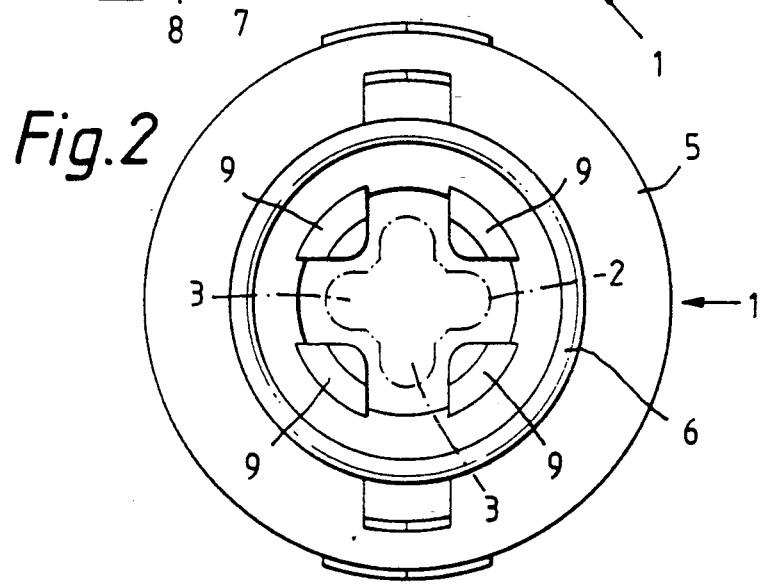
FIG. 2 is an end view of the coupling member, in the direction of the arrow II in FIG. 1.

To engage the drive coupling, the splined shaft 2 is inserted into the socket inner part 6 which at this stage is located in its outermost position (shown in the drawings) relative to the socket outer part 5. If the shaft 2 and the socket member 1 are aligned, the splines 3 of the shaft slidingly engage between the spline-engaging members 9 of the socket inner part 6, as shown in FIG. 2 in which the position of the shaft is shown in clotted lines. Then, when the coupling is rotated, each arm 7 moves along one or other of the inclined portions 12 of the respective guide track 8 (depending on the direction of rotation) and into engagement with the drive point 13 at the end of that inclined portion. That is, the socket inner part 6 initially rotates relative to the socket outer part 6 and moves inwardly into the socket against the spring 10 until the arms 7 engage the appropriate drive points 13.

If there is a degree of misalignment between the shaft 2 and the socket member 1 then, as the coupling is engaged, the inclined portions 12 of the guide tracks 8 permit rotation of the inner part 6 relative to the outer part 5 to take up the misalignment. Because there is an inclined portion of track extending in both directions away from each start point 11, the inner part 6 can rotate in either direction to take up the misalignment, depending on which sides of the splines 3 and members 9 are in engagement. Thereafter, as previously described, the arms 7 will move into engagement with the appropriate ones of the drive points 13 when the coupling is rotated.

If there is total misalignment between the shaft 2 and the socket member 1 (i.e. the splines 3 meet the members 9 square on) and rotation of the inner part 6 to take up the misalignment does not occur, then the initial engagement of the splines 3 with the members 9 will push the inner part 6 straight into the socket 1 until the arms 7 enter the further guide tracks 14. Rotation of the inner part 6 to correct the misalignment is then ensured by movement of the arms 7 along the tracks 14 as the coupling is being engaged. It will be appreciated that, in these circumstances, it is sufficient to provide for rotation of the inner part 6 in one direction only to correct the misalignment. When the coupling is engaged, the spring 10 returns the inner part to a position in which the arms 7 are no longer engaged in the tracks 14 but are positioned for movement into engagement with the appropriate ones of the drive points 13 when the coupling is rotated.

When the coupling is disengaged (i.e. the shaft 2 is withdrawn from the socket member 1), the spring 10 returns the socket inner part 6 to its initial position in which the arms 7 engage the start points 11 of the tracks 8.

It has been found that the coupling will operate satisfactorily with a degree of clearance between the outer and inner parts 5,6 of the socket member 1 and that the existence of such a clearance can be advantageous in that it allows a greater degree of axial misalignment between the rotatable members, for example, the shafts that are being coupled together.

A drive coupling as just described can be used in a xerographic copying machine to transmit rotational drive from the main body of the machine to components that are contained within a cassette that can be removed from and re-inserted in the machine. In some copying machines, many of the elements required to carry out the xerographic process are contained within such a cassette: for example, the photoreceptor, charge corotron, developing device, transfer corotron and cleaning device of a machine may all be contained within a cassette with the intention that, when the cassette is exhausted or a different colored toner is required, it can be removed and replaced by another. To facilitate the insertion of a new cassette, it is clearly desirable that the coupling between the rotary drive shaft of the cassette and the rotary driving shaft in the main body of the machine should be engaged automatically as the cassette is inserted even if the two shafts are rotationally misaligned. The drive coupling described above enables this to be achieved. To that end, the socket member 1 of the coupling is connected to the driving shaft in the main body of the copying machine and the splined shaft 2 is actually the splined end of the input drive shaft of the cassette. Then, if there is any misalignment between the shafts when the cassette is inserted into the machine, the inner part 6 of the socket member 1 will rotate to take up the misalignment as described above. The provision for rotation of the inner part 6 in both directions (i.e. the two inclined portions 12 in each of the tracks 8) is of particular advantage: it eliminates the possibility (which would exist if rotation in only one direction were possible) of the splines 3 riding over the spline-engaging members 9, with consequent risk of damage to those components.

To enable the driving shaft in the main body of the copying machine to be connected to the socket member 1, the socket outer part 5 has a shaft receiving sleeve 15 formed at its closed end. The inner end of the sleeve, which is closed, projects into the interior of the socket member and forms a seat for the spring 10. The outer end of the sleeve is open to receive the driving shaft 20 (FIG. 6). A circumferentially-extending slot 16 is formed in the wall of the sleeve 15 adjacent the open end and, when the driving shaft 20 is in position, a screw 17 is passed through the slot and its threaded portion is engaged in a threaded hole 18 which opens into a flat 19 on the shaft. The shaft is a loose fit within the sleeve 15 and the portion 21 of the screw 17 nearest the screw head (i.e. the portion that is located inside the slot) is unthreaded and slightly smaller than the width of the slot: consequently, the sleeve 15 and hence the socket outer part 5 can rotate relative to the shaft 20 to an extent determined by the length of the slot. This limited rotational movement may, in certain circumstances, supplement the rotation of the socket inner part 6 in accommodating misalignment of the driving shaft and the cassette shaft when the shafts are being coupled together. It will be appreciated, however, that is is not essential to provide for limited rotation of the socket member relative to the driving shaft 20 when a coupling of the type shown in FIGS. 1 to 5 is used. The slot 16 can accordingly be replaced by a hole through which the screw is threaded into the driving shaft.

Although the coupling described above with reference to the drawings has been described as suitable for use in a xerographic copying machine, it could be used in other circumstances where two rotatable members (not necessarily shafts) are to be coupled together.

I claim:

1. A rotary drive coupling for receiving a splined shaft, the coupling comprising:

two interengaged parts, each having an axis, the parts being coaxially aligned;

one of the interengaged parts having coaxial opposing ends, the one part being connectable at one end thereof to a drive means, the other end having a cylindrical recess for housing the other interengaged part, said one part having diametrically opposed openings therethrough at said other end and perpendicular to the axis of said one part, each of said openings defining a predetermined guide surface having a start point and inclined guide surfaces oppositely disposed and extending from said start point;

said other interengaged part having a cylindrical outer surface with diametrically opposing arms thereon which are perpendicular to the axis thereof and having a coaxial aperture therethrough, the aperture having internal splines parallel with the axis thereof for receiving a splined shaft to be drivingly rotated thereby, said other part being rotatably positioned in the cylindrical recess of the one part with the arms thereof being disposed in the openings of the one part and on the guide surfaces thereof; and spring means to urge the arms of the other part to the start point of each of the guide surfaces of the openings in said one part, so that insertion of the splined shaft to be rotated, if misaligned with the internal splines of the other part, causes the arms of the other part to be guidingly moved in opposite directions along the inclined guide surfaces from the start point, thereby rotating said other part to allow the misaligned splined shaft to be inserted therein.

2. The rotary drive coupling of claim 1, in which the guide surfaces of each of the openings of the one part further define a mouth directly opposite the start point of said openings, the mouths each providing entrance into another portion of the openings having a second inclined guide surface, the second inclined guide surfaces being in opposite directions; and said other part with the arms being axially movable within and movable relative to the cylindrical recess of the said one part, so that, if insertion of the splined shaft to be rotated does not cause said other part to be rotated from the start point, the inserted splined shaft moves the arms of the other part axially away from the start point and through the mouths in the openings of the one part and into engagement with the second inclined guide surfaces, thereby causing relative rotation of the other part and permitting the splined shaft to become aligned with the splines of the other part and into driving engagement with the drive coupling.

3. A rotary drive coupling for use in a xerographic reproduction machine having a xerographic cassette which is removable from the machine, said cassette and said machine each including a respective interengageable rotatable member, one of which is a splined shaft and the other is a rotary drive coupling in which the splined shaft is received, the drive coupling comprising:

first and second parts being interengaged for limited relative movement therebetween and having coincident axes;

the first part having coaxial opposing ends, one end being connectable to a drive means and the other end having a cylindrical recess with a surrounding cylindrical wall for slidably housing the second part, diametrically opposing openings being provided through the surrounding cylindrical wall of said first part at said other end, each of said openings defining a guide surface having a start point and inclined guide surfaces oppositely disposed and extending from said start point;

the second part having a cylindrical outer surface with diametrically opposing arms and a coaxial aperture therethrough with internal splines, the second part being positioned in the cylindrical recess of the first part with the arms thereof being disposed in the openings of the first part and on the guide surfaces defined by said openings; and spring means urging the arms of the second part to the start point on each of the guide surfaces of the openings in the first part, so that a splined shaft to be driven by the rotary drive coupling may be inserted into the splined aperture of the second part thereof without spline alignment.

4. The rotary drive coupling of claim 3, wherein the spring means is located in the cylindrical recess of the first part within the second part and axially urges the arms of the second part towards said start point on each of said guide surfaces.

5. The rotary drive coupling of claim 4, in which said inclined guide surfaces extend from the start point for allowing the second part arms to be moved in opposite directions along the inclined guide surfaces and thereby cause the second part to rotate when a splined shaft is inserted into the aperture of the second part with their respective splines misaligned, thereby assuring entry of the misaligned splined shaft into the rotary drive coupling.

6. The rotary drive coupling of claim 5, in which the guide surfaces of each of the openings of said first part further comprises a mouth directly opposite and aligned with the start point of said guide surfaces, the mouths each providing entrance into another portion of the respective openings which have oppositely directed second inclined guide surfaces, so that the arms of the second part may be moved relative to the first part in a direction coaxially with the coincident axes of said first and second parts and into said mouths, thereby assuring relative rotation between both the first and second parts and the second part and the splined shaft to be driven and thus enabling the insertion and coupling of the splined shaft to the rotary drive coupling.

7. A rotary drive coupling having opposed ends, one end of which is attached to a drive means and the other end being adapted for insertion and withdrawal of a splined shaft to be driven by the drive means through said coupling, the rotary drive coupling comprising:

inner and outer parts, each having an axis, the axes being mutually co-axial with each other, the outer part being connectable to a drive means at one end and the other end having a cylindrical recess therein with a cylindrical internal surface and a bottom, the outer part having diametrically opposing openings through the outer part at said other end and through the cylindrical internal surface thereof in a direction perpendicular to the axis of the outer part one portion of each of said openings having edges provided with inclined guide surfaces oppositely disposed and from a predetermined fixed location and another portion of the openings each having a mouth spaced from and aligned with the fixed location, said mouths each providing entrance into a second inclined edge surface, the second inclined edge surfaces of the openings being in opposite directions, said inner part having a cylindrical outer surface and an aperture coaxially therethrough to define a socket-like shape with an interior surface having spline-engaging parts symmetrically disposed about its axis, at least two opposing arms being disposed on the outer surface of the inner part and positioned in the openings of the outer part for providing engagement between said inner and outer parts, while said outer surface of the inner part is in sliding contact with the cylindrical internal surface of the outer part; and a spring being housed between the inner part and the bottom of the recess of the outer part, which urges the arms disposed on the outer surface of the inner part into said fixed location on the openings of the outer part, so that a splined shaft may be inserted into the aperture of the inner part of the coupling without the need to have the splines of the shaft angularly aligned with the spline-engaging parts of the inner part of the coupling.

* * * * *